(12) United States Patent
Vollmar et al.

(10) Patent No.: US 10,668,788 B2
(45) Date of Patent: Jun. 2, 2020

(54) SIDE MOUNTED SLIDING WINDOW

(71) Applicant: Dynamic Metals, LLC, Elkhart, IN (US)

(72) Inventors: Randall Vollmar, Osceola, IN (US); Andrew Croy, Elkhart, IN (US); William Glen Elijah, Goshen, IN (US); Gene L. Thompson, Goshen, IN (US)

(73) Assignee: Dynamic Metals, LLC, Elkhart, IN (US)

(*) Notice: Subject to any disclaimer, the term of this patent is extended or adjusted under 35 U.S.C. 154(b) by 174 days.

(21) Appl. No.: 15/825,619

(22) Filed: Nov. 29, 2017

(65) Prior Publication Data

US 2018/0147917 A1 May 31, 2018

Related U.S. Application Data

(60) Provisional application No. 62/428,133, filed on Nov. 30, 2016.

(51) Int. Cl.
 *B60J 1/16* (2006.01)
 *B61D 25/00* (2006.01)
 *B60J 1/00* (2006.01)

(52) U.S. Cl.
 CPC ............. *B60J 1/16* (2013.01); *B60J 1/007* (2013.01); *B61D 25/00* (2013.01)

(58) Field of Classification Search
 CPC .. B60J 1/16; B60J 1/007; B61D 25/00; E05D 15/0686; E05D 15/165
 See application file for complete search history.

(56) References Cited

U.S. PATENT DOCUMENTS 3,584,417 A * 6/1971 Gatton ............... E05D 15/0686
 49/404
4,042,004 A * 8/1977 Kwan ....................... B60J 1/14
 160/91

(Continued)

FOREIGN PATENT DOCUMENTS

RU 17482 U1 4/2001
WO 2007141314 A2 12/2007

OTHER PUBLICATIONS

Internationals Search Report and Written Opinion, PCT/US2017/063620; dated Mar. 13, 2018.

*Primary Examiner* — Justin B Rephann
(74) *Attorney, Agent, or Firm* — Dinsmore & Shohl LLP (57) ABSTRACT

A sliding window assembly for a vehicle includes a window frame having a top rail portion coupled to a bottom rail portion by side rail portions. The top rail portion has a shorter length than the bottom rail portion. A fixed window is attached to the window. A sliding window is mounted in a sliding sash. The sliding sash is moveable relative to the fixed window. The sliding sash includes a top sash portion coupled to a bottom sash portion by side sash portions. The top sash portion has a shorter length than the bottom sash portion. A removable track assembly is attached to the top rail portion. At least one bearing is attached to the top sash portion of the sliding window sash. The at least one bearing is slidingly engaged with the removable track supporting the sliding sash over an entire travel range between open and closed positions preventing tilting of the sliding sash relative to the window frame.

18 Claims, 7 Drawing Sheets

(56) References Cited

U.S. PATENT DOCUMENTS

| | | | | |
|---|---|---|---|---|
| 4,454,687 A | * | 6/1984 | Baker | ................ E05D 158/165 49/419 |
| 6,330,765 B1 | * | 12/2001 | Dahl | ........................ B60J 1/16 49/453 |
| 2009/0193719 A1 | * | 8/2009 | Barnea | ................ E05D 15/0686 49/468 |
| 2009/0267382 A1 | | 10/2009 | Smith et al. | |
| 2011/0192091 A1 | * | 8/2011 | Smith | ...................... B60J 1/007 49/490.1 |
| 2012/0167469 A1 | * | 7/2012 | Maltaverne | ................ B60J 1/16 49/360 |
| 2012/0227325 A1 | * | 9/2012 | Diamant | .................... B60J 1/16 49/149 |

\* cited by examiner

SIDE MOUNTED SLIDING WINDOW

CROSS-REFERENCE TO RELATED APPLICATIONS

This application claims priority of U.S. Provisional Patent Application Ser. No. 62/428,133, filed Nov. 30, 2016, the entire contents of which are incorporated herein by reference.

FIELD OF THE INVENTION

The invention relates to sliding windows for train cars.

BACKGROUND OF THE INVENTION

Conductors for trains may be required to open a window when operating a train. Various types of sliding windows may be utilized. Typically the sliding window is mounted for horizontal movement at its upper and lower edges to respective upper and lower horizontal rails.

Some known horizontal rail mechanisms have the problem that the sliding mechanism may become jammed or cause the window to tilt leading to misalignment.

In typical window frames the windows are four sided with square and rectangular windows being examples. In such windows the center of mass is generally positioned in the middle of the rails. However with a window that has differing lengths on the top and bottom of the sliding window, tilting when opening and closing the window is an issue.

There is a need in the art, for an improved sliding window that does not jam or tilt.

SUMMARY OF THE INVENTION

In one aspect, there is disclosed a sliding window assembly for a vehicle including a window frame having a top rail portion coupled to a bottom rail portion by side rail portions. The top rail portion has a shorter length than the bottom rail portion. The top, bottom and side rails include two laterally offset channels. A fixed window is attached to the window frame in one of the laterally offset channels. A sliding window is mounted in a sliding sash. The sliding sash is disposed in the other of the laterally offset channels. The sliding sash includes a top sash portion coupled to a bottom sash portion by side sash portions. The top sash portion has a shorter length than the bottom sash portion. A removable track assembly is attached to the top rail portion. At least one bearing is attached to the top sash portion of the sliding window sash. The at least one bearing is slidingly engaged with the removable track supporting the sliding sash over an entire travel range between open and closed positions preventing tilting of the sliding sash relative to the window frame.

In another aspect, there is disclosed a sliding window assembly for a vehicle including a window frame having a top rail portion coupled to a bottom rail portion by greater than two side rail portions. The top rail portion has a shorter length than the bottom rail portion. The top, bottom and side rails include two laterally offset channels. A fixed window is attached to the window frame in one of the laterally offset channels. A sliding window is mounted in a sliding sash. The sliding sash is disposed in the other of the laterally offset channels. The sliding sash includes a top sash portion coupled to a bottom sash portion by greater than two side sash portions. The top sash portion has a shorter length than the bottom sash portion. A removable track assembly is attached to the top rail portion. At least one bearing is attached to the top sash portion of the sliding window sash. The at least one bearing is slidingly engaged with the removable track supporting the sliding sash over an entire travel range between open and closed positions preventing tilting of the sliding sash relative to the window frame.

In a further aspect there is disclosed, a sliding window assembly for a vehicle including a window frame having a top rail portion coupled to a bottom rail portion by side rail portions. The top rail portion has a shorter length than the bottom rail portion. The top, bottom and side rails include two laterally offset channels. A fixed window is attached to the window frame in one of the laterally offset channels. A sliding window is mounted in a sliding sash. The sliding sash is disposed in the other of the laterally offset channels. The sliding sash includes a top sash portion coupled to a bottom sash portion by side sash portions. The top sash portion has a shorter length than the bottom sash portion. A removable track assembly is attached to the top rail portion. The removable track assembly includes an L-shaped body having a planar attachment portion attached to the top rail portion and a shaped guide portion extending at an angle from the planar attachment portion. At least one bearing is attached to the top sash portion of the sliding window sash. The at least one bearing is slidingly engaged with the removable track supporting the sliding sash over an entire travel range between open and closed positions preventing tilting of the sliding sash relative to the window frame.

DETAILED DESCRIPTION OF THE PREFERRED EMBODIMENTS

Referring to the figures there is shown a sliding window assembly 10. The sliding window assembly 10 includes a window frame 12 attached to a vehicle in a window opening (not shown). In one aspect the vehicle may be a train. The window frame 12 includes a top rail portion 14 coupled to a bottom rail portion 16 by side rail portions 18. In one aspect, the window frame 12 may include a top rail portion 14 that has a shorter length than the bottom rail portion 16. Additionally, the window frame 12 may include more than 4 sides with five sides shown in the figures. The window frame 12 may include a fixed glazing or window 20 attached to the window frame 12. The top, bottom and side rails 14, 16, 18 include two laterally offset channels 19 one receiving the fixed window 20 and the other receiving a sliding window 22.

The sliding window 22 is mounted in a sliding sash or frame 24. The sliding window 22 may include an encapsulation structure 26 coupling the window 22 to the sliding sash 24. The sliding sash 24 includes a top sash portion 28 coupled to a bottom sash portion 30 by side sash portions 32. One of the side sash portions may include a latching mechanism 33 attached thereon that mates with a corresponding latch attached to the window frame 12. Again, the sliding sash 24 may include a top sash portion 28 that has a shorter length than the bottom sash portion 30. Additionally, the sliding sash 24 may include more than 4 sides such as with five sides shown in the figures.

The bottom sash portion 30 includes a guide slot 34 formed therein. A protrusion 36 formed on the window frame extends into the guide slot 34 to maintain alignment of the sliding sash 24 in the window frame 12 but does not otherwise support the weight of the sliding sash 24.

A removable track assembly 38 is attached to the top rail portion 14. The removable track portion 38 may be attached by fasteners to the top rail portion 14 allowing easy replacement and servicing. The removable track assembly 38 includes an L-shaped body 40 having a planar attachment portion 42 attached to the top rail portion 14 and a shaped guide portion 44 extending at an angle from the planar attachment portion 42. The shaped guide portion 44 has a shape that includes a combination of two truncated cones. The first truncated cone 46 extends from the material of the guide portion 44 and includes angled side walls 48 that terminate at an apex 50. The second truncated cone 52 includes angled side walls 54 that start at the apex 50 and terminate at a base 56 of the second truncated cone 52. The removable track assembly 38 may be formed of a metal material, such as aluminum or steel. The guide portion 44 may be machined or otherwise formed on the L-shaped body 40 or may be separately attached to the L-shaped body 40.

The planar attachment portion 42 of the L-shaped body 40 may include a cut out section 41 formed thereon. A reed switch 43 may be positioned in the cut out section 41 and be attached to the window frame 12. The reed switch may be utilized to indicate of the position sliding sash 24.

Figure 1:
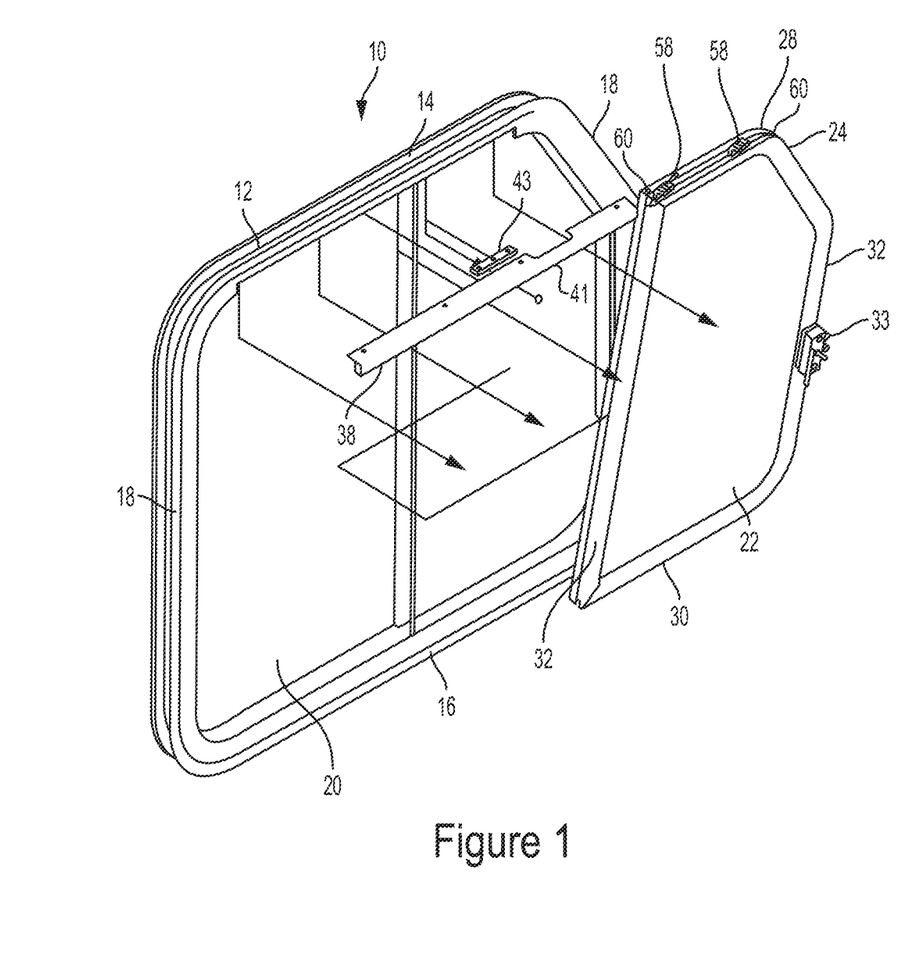
FIG. 1 is an exploded perspective view of a window assembly.
Figure 2:
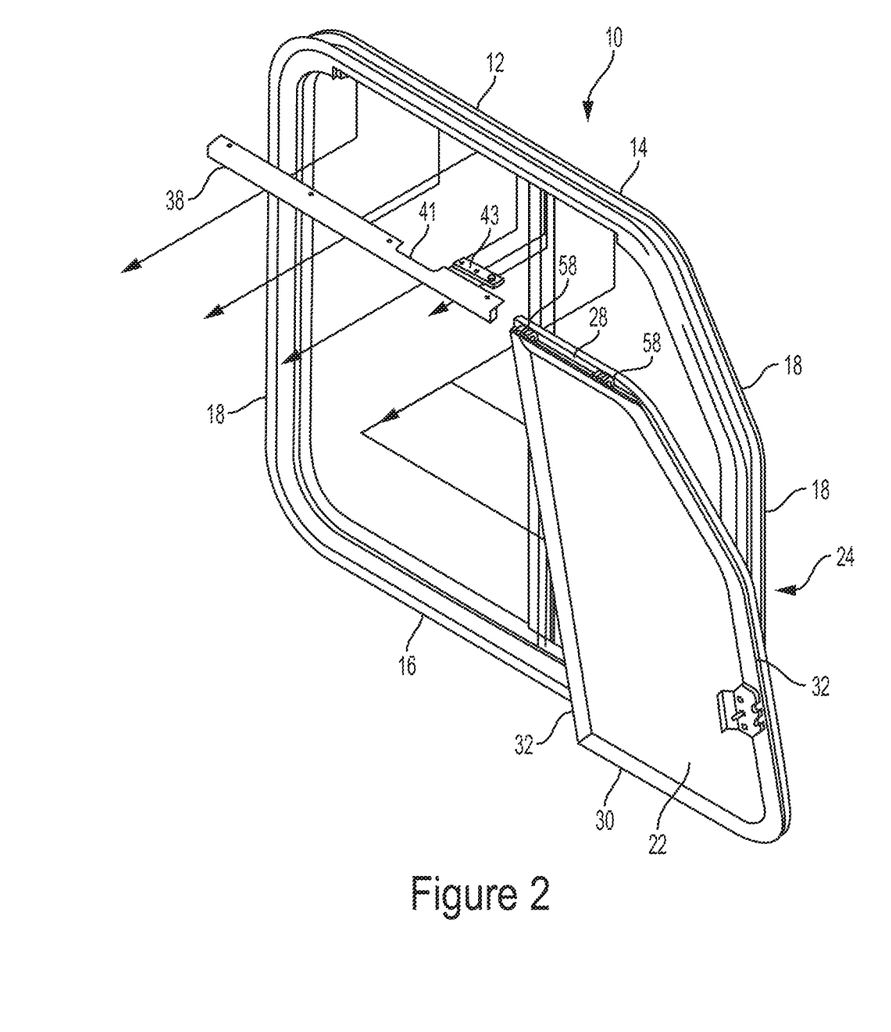
FIG. 2 is an exploded perspective view of a window assembly.
Figure 7:
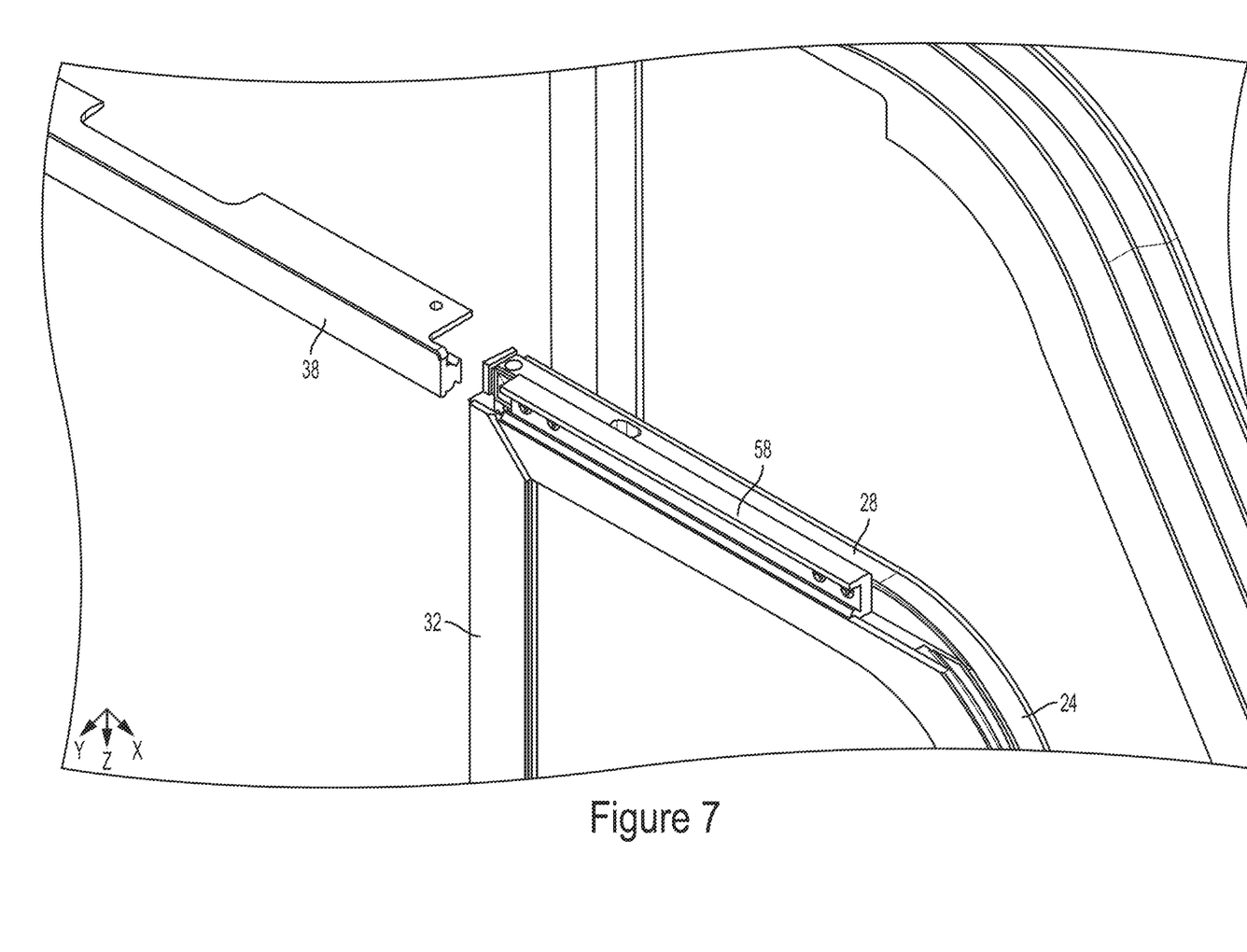
FIG. 7 is a partial perspective view of a window assembly showing the bearings.

At least one bearing 58 is attached to the top sash portion 28 of the sliding window sash 24. The bearing may have various lengths to be supported on the removable track assembly 38. In the depicted FIGS. 1-2, a pair of bearings 58 is attached to opposing ends 60 of the top sash portion 28 of the sliding window sash 24. Alternatively, as shown in FIG. 7, the bearing 58 may be single piece attached to the top sash portion 28 of the sliding window sash 24. The bearings 58 may be attached with a fastener to allow easy replacement of the bearings 58 for servicing the window assembly 10. The bearings 58 include a body portion 60 having a slot 62 formed therein, the slot 62 includes a shape complimentary with the guide portion 44 so that the guide portion 44 is retained laterally within the slot 62. The slot 62 includes a base surface 64 with opposing first angled surfaces 66 extending therefrom. The first angled surfaces 66 terminate at an apex 68. Second angled surfaces 70 extend from the apex 68 and terminate at a top ledge 72 of the body portion 60. The bearings 58 may be formed of various materials including plastics.

In use, the window frame 12 may be mounted in an opening of a vehicle such as a train. The fixed window 20 may be mounted to the window frame 12 in one of the channels 19 of the window frame 12. The bearings 58 may be attached to the sliding sash 24 including the sliding window 22. The guide portion 44 of the removable track assembly 38 maybe positioned in the slot 62 of the bearings 58. The sliding sash 24 may then be positioned in the other channel 19 of the window frame 12. The removable track assembly 38 may then be attached to the window frame 12 retaining the sliding sash 24 relative to the window frame 12. The weight of the sliding sash 24 is supported by the bearings 58. The protrusion 36 formed on the window frame 12 extends into the guide slot 34 to maintain alignment of the sliding sash 24 in the window frame 12 but does not otherwise support the weight of the sliding sash 24.

Figure 3:
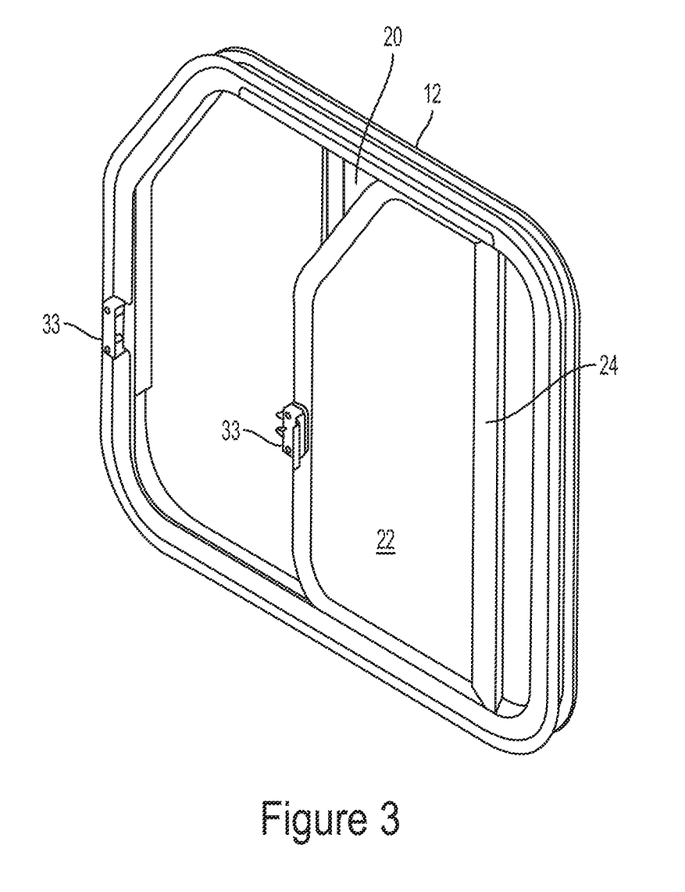
FIG. 3 is perspective view of a window assembly in an open position.
Figure 4:
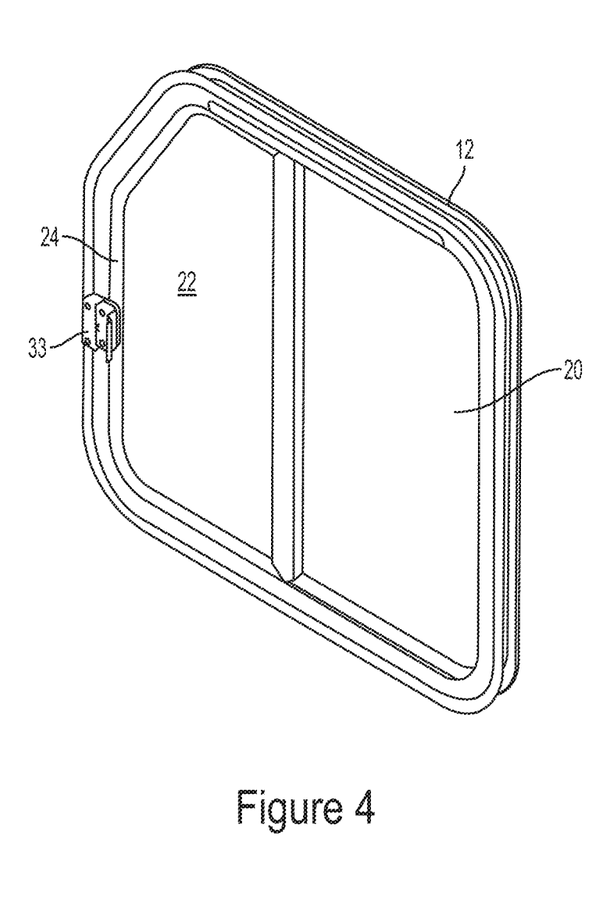
FIG. 4 is perspective view of a window assembly in a closed position.
Figure 5:
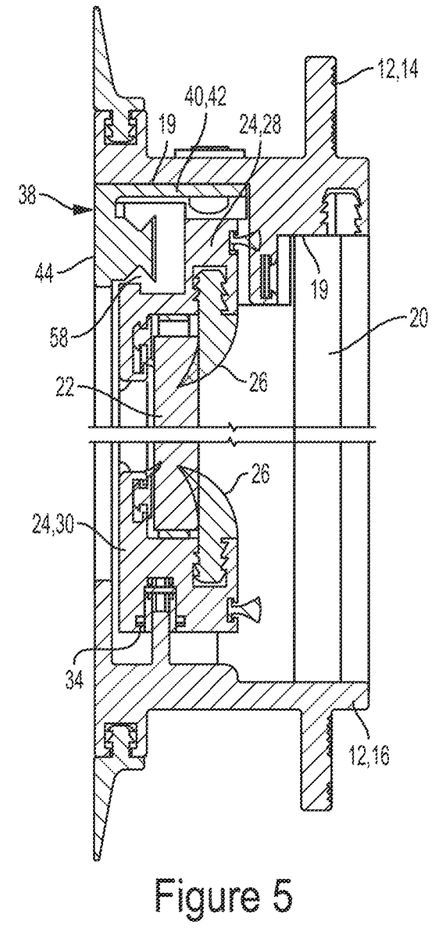
FIG. 5 is sectional view of a window assembly.
Figure 6:
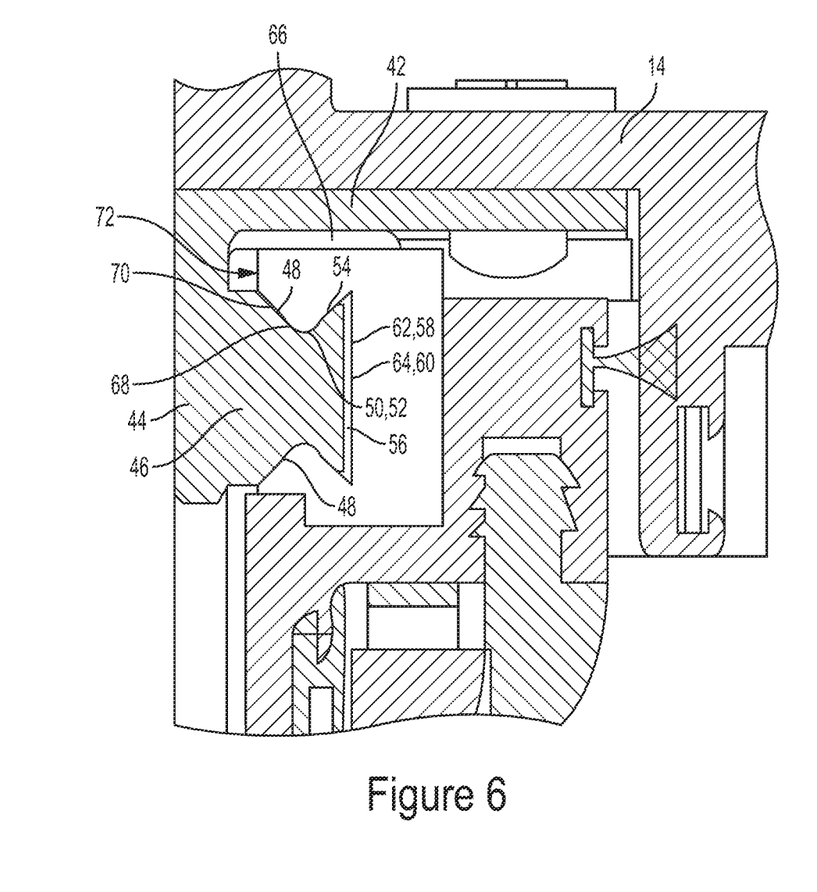
FIG. 6 is a partial sectional view of a window assembly showing the bearings.

An operator may engage and disengage the latching mechanism 33 and apply a force to the sliding sash to move the sliding window sash 24 between the open position shown in FIG. 3 and the closed position shown in FIG. 4. The bearings 58 attached to opposing ends 60 of the top sash portion 28 or as one piece to the top sash portion 28 of the sliding window sash 24 are slidingly engaged with the guide portion 44 of the removable track 38 and support the sliding sash 24 over the entire travel range between the open and closed positions and prevent jamming or tilting of the sliding sash 24. Additionally, the bottom rail portion 16 of the window does not include the bearings 58. In this manner debris that may gather in the bottom rail portion 16 will not jam the bearings 58 and prevent reliable movement of the sliding sash. As noted above the bearings 58 of the present application are attached to the top rail 14 and gravity will prevent accumulation of any debris. Further the bearing 58 is covered by the removable track assembly 38 attached to the top rail portion 14 preventing entry of debris. The removable track 38 may be removed from the window frame 12 to easily service the window assembly 10 when required.

The window frame 12 including a non-uniform shape having greater than two side rail portions 18 and the corresponding sliding sash 24 including greater than two side sash portions 32 presents a sliding window that may be prone to tilting due to the difference in length of the top and bottom rails and sash portions and the distribution of weight in the sliding sash 24. Supporting the weight of the sliding sash 24 at the top portion of the sliding sash 24 with the bearings 58 and corresponding structure as described above provides a sliding window of non-uniform shape that does not tilt.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A sliding window assembly for a vehicle comprising:
a window frame including a top rail portion coupled to a bottom rail portion by side rail portions, the top rail portion having a shorter length than the bottom rail portion, the top, bottom and side rails including two laterally offset channels;
a fixed window attached to the window frame in one of the laterally offset channels;
a sliding window mounted in a sliding sash, the sliding sash disposed in the other of the laterally offset channels, the sliding sash including a top sash portion coupled to a bottom sash portion by side sash portions, the top sash portion having a shorter length than the bottom sash portion;
a removable track assembly attached to the top rail portion;
at least one bearing attached to the top sash portion of the sliding window sash, the at least one bearing slidingly engaged with the removable track supporting the sliding sash over an entire travel range between open and closed positions preventing tilting of the sliding sash relative to the window frame, wherein the bottom sash portion includes a guide slot formed therein and a protrusion formed on the window frame extends into the guide slot maintaining alignment of the sliding sash in the window frame.

2. The sliding window assembly of claim 1 wherein the at least one bearing includes two bearings attached to opposing ends of the top sash portion.

3. The sliding window assembly of claim 1 wherein the at least one bearing includes a one piece bearing attached to the top sash portion.

4. The sliding window assembly of claim 1 wherein at least one of the side sash portions includes a latching mechanism attached thereon that mates with a corresponding latch attached to the window frame.

5. The sliding window assembly of claim 1 wherein the sliding sash includes greater than two side sash portions.

6. The sliding window assembly of claim 1 wherein the removable track assembly includes an L-shaped body having a planar attachment portion attached to the top rail portion and a shaped guide portion extending at an angle from the planar attachment portion.

7. The sliding window assembly of claim 6 wherein the shaped guide portion having a shape including a combination of two truncated cones, the first truncated cone extending from the guide portion and including angled side walls that terminate at an apex, the second truncated cone including angled side walls that start at the apex and terminate at a base of the second truncated cone.

8. The sliding window assembly of claim 6 wherein the planar attachment portion of the L-shaped body includes a cut out section formed thereon and a reed switch positioned in the cut out section and attached to the window frame, the reed switch indicating a position of the sliding sash in the window frame.

9. The sliding window assembly of claim 6 wherein the bearings include a body portion having a slot formed therein, the slot including a shape complimentary with the guide portion wherein the guide portion is retained laterally within the slot.

10. The sliding window assembly of claim 9 wherein the slot includes a base surface with opposing first angled surfaces extending therefrom, the first angled surfaces terminating at an apex and the second angled surfaces extending from the apex and terminating at a top ledge of the body portion.

11. A sliding window assembly for a vehicle comprising:
a window frame including a top rail portion coupled to a bottom rail portion by greater than two side rail portions, the top rail portion having a shorter length than the bottom rail portion, the top, bottom and side rails including two laterally offset channels;
a fixed window attached to the window frame in one of the laterally offset channels;
a sliding window mounted in a sliding sash, the sliding sash disposed in the other of the laterally offset channels, the sliding sash including a top sash portion coupled to a bottom sash portion by greater than two side sash portions, the top sash portion having a shorter length than the bottom sash portion;
a removable track assembly attached to the top rail portion, the removable track assembly includes an L-shaped body having a planar attachment portion attached to the top rail portion and a shaped guide portion extending at an angle from the planar attachment portion;
at least one bearing attached to the top sash portion of the sliding window sash, the at least one bearing slidingly engaged with the removable track supporting the sliding sash over an entire travel range between open and closed positions preventing tilting of the sliding sash relative to the window frame, wherein the bearings include a body portion having a slot formed therein, the slot including a shape complimentary with the guide portion wherein the guide portion is retained laterally within the slot.

12. The sliding window assembly of claim 11 wherein the at least one bearing includes two bearings attached to opposing ends of the top sash portion.

13. The sliding window assembly of claim 11 wherein the at least one bearing includes a one piece bearing attached to the top sash portion.

14. The sliding window assembly of claim 11 wherein the shaped guide portion having a shape including a combination of two truncated cones, the first truncated cone extending from the guide portion and including angled side walls that terminate at an apex, the second truncated cone including angled side walls that start at the apex and terminate at a base of the second truncated cone.

15. The sliding window assembly of claim 11 wherein the planar attachment portion of the L-shaped body includes a cut out section formed thereon and a reed switch positioned in the cut out section and attached to the window frame, the reed switch indicating a position of the sliding sash in the window frame.

16. The sliding window assembly of claim 11 wherein the slot includes a base surface with opposing first angled surfaces extending therefrom, the first angled surfaces terminating at an apex and the second angled surfaces extending from the apex and terminating at a top ledge of the body portion.

17. A sliding window assembly for a vehicle comprising:
a window frame including a top rail portion coupled to a bottom rail portion by side rail portions, the top rail portion having a shorter length than the bottom rail portion, the top, bottom and side rails including two laterally offset channels;
a fixed window attached to the window frame in one of the laterally offset channels;
a sliding window mounted in a sliding sash, the sliding sash disposed in the other of the laterally offset channels, the sliding sash including a top sash portion coupled to a bottom sash portion by side sash portions, the top sash portion having a shorter length than the bottom sash portion;
a removable track assembly attached to the top rail portion the removable track assembly including an L-shaped body having a planar attachment portion attached to the top rail portion and a shaped guide portion extending at an angle from the planar attachment portion, wherein the shaped guide portion having a shape including a combination of two truncated cones, the first truncated cone extending from the guide portion and including angled side walls that terminate at an apex, the second truncated cone including angled side walls that start at the apex and terminate at a base of the second truncated cone;
at least one bearing attached to the top sash portion of the sliding window sash, the at least one bearing slidingly engaged with the removable track supporting the sliding sash over an entire travel range between open and closed positions preventing tilting of the sliding sash relative to the window frame.

18. A sliding window assembly for a vehicle comprising:
a window frame including a top rail portion coupled to a bottom rail portion by side rail portions, the top rail portion having a shorter length than the bottom rail portion, the top, bottom and side rails including two laterally offset channels;
a fixed window attached to the window frame in one of the laterally offset channels; a sliding window mounted in a sliding sash, the sliding sash disposed in the other of the laterally offset channels, the sliding sash including a top sash portion coupled to a bottom sash portion by side sash portions, the top sash portion having a shorter length than the bottom sash portion;
a removable track assembly attached to the top rail portion the removable track assembly including an L-shaped body having a planar attachment portion attached to the top rail portion and a shaped guide portion extending at an angle from the planar attachment portion wherein the planar attachment portion of the L-shaped body includes a cut out section formed thereon and a reed switch positioned in the cut out section and attached to the window frame, the reed switch indicating a position of the sliding sash in the window frame;
at least one bearing attached to the top sash portion of the sliding window sash, the at least one bearing slidingly engaged with the removable track supporting the sliding sash over an entire travel range between open and closed positions preventing tilting of the sliding sash relative to the window frame.

* * * * *